United States Patent
Venkateswaran et al.

(10) Patent No.: US 12,135,709 B2
(45) Date of Patent: Nov. 5, 2024

(54) ADAPTIVE SNAPSHOT CONTROLLER

(71) Applicant: Kyndryl, Inc., New York, NY (US)

(72) Inventors: Sreekrishnan Venkateswaran, Bangalore (IN); Manish Gupta, New Delhi (IN)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 18/219,912

(22) Filed: Jul. 10, 2023

(65) Prior Publication Data

US 2023/0350876 A1 Nov. 2, 2023

Related U.S. Application Data

(63) Continuation of application No. 17/208,015, filed on Mar. 22, 2021, now Pat. No. 11,741,076.

(51) Int. Cl.
| | |
|---|---|
| *G06F 16/23* | (2019.01) |
| *G06F 9/455* | (2018.01) |
| *G06N 7/01* | (2023.01) |

(52) U.S. Cl.
CPC ...... *G06F 16/2365* (2019.01); *G06F 9/45558* (2013.01); *G06N 7/01* (2023.01); *G06F 2009/45591* (2013.01)

(58) Field of Classification Search
CPC ............. G06F 16/2365; G06F 9/45558; G06F 2009/45591; G06F 2201/815;

(Continued)

(56) References Cited

U.S. PATENT DOCUMENTS 7,818,299 B1 10/2010 Federwisch
7,953,704 B2 5/2011 Anderson
(Continued)

FOREIGN PATENT DOCUMENTS

CN 107632899 B 12/2020
JP 6309103 B2 4/2018

OTHER PUBLICATIONS

"Confidence Intervals," https://www.mathsisfun.com/data/confidence-interval.html.
(Continued)

*Primary Examiner* — Hicham Skhoun
(74) *Attorney, Agent, or Firm* — Dan Housley; Andrew D. Wright; Calderon Safran & Wright P.C.

(57) ABSTRACT

A method and related apparatus adaptively control snapshot replication of a plurality of server snapshots in a multi-tenant public cloud using snapshot service. A plurality of snapshot requests are received from a plurality of clients in the multi-tenant public cloud and are each associated with a service level agreement (SLA). The SLA includes a corresponding completion deadline and a slippage penalty. A probabilistic model calculates, for active snapshot flows, a completion time for each of the snapshot requests. If any of the predicted completion times exceed their corresponding completion deadlines, a possible MISS event is produced for an associated first snapshot. The snapshot controller component, in response to producing the possible MISS event, minimizes a probability of breaching fulfilment times for the multi-tenant cloud. The slippage penalty is calculated for each of the plurality of snapshot requests. A second snapshot is identified from among the plurality of snapshot requests.

20 Claims, 8 Drawing Sheets

(58) Field of Classification Search
CPC .. G06F 2201/84; G06F 9/4887; G06F 9/5072; G06F 11/008; G06F 11/1464; G06F 11/2028; G06F 11/2094; G06F 16/275; G06N 7/01
USPC .......................................................... 707/639
See application file for complete search history.

(56) References Cited

U.S. PATENT DOCUMENTS

| | | | |
|---|---|---|---|
| 8,010,493 | B2 | 8/2011 | Anderson |
| 8,356,013 | B2 | 1/2013 | Fachan |
| 8,959,509 | B1 | 2/2015 | Sobel |
| 9,916,321 | B2 | 3/2018 | Sundaram |
| 10,628,378 | B2 | 4/2020 | Dayal |
| 2008/0320482 | A1 | 12/2008 | Dawson |
| 2011/0295986 | A1* | 12/2011 | Ferris ................. H04L 67/10 709/222 |
| 2013/0117064 | A1 | 5/2013 | Sadeghi |
| 2015/0019707 | A1 | 1/2015 | Raghunathan |
| 2016/0323157 | A1 | 11/2016 | Marvasti |
| 2018/0060184 | A1 | 3/2018 | Thakkar |
| 2018/0067819 | A1* | 3/2018 | Kotha ................. G06F 11/1461 |
| 2020/0026579 | A1* | 1/2020 | Bahramshahry ...... G06F 9/5077 |
| 2020/0110675 | A1 | 4/2020 | Wang |
| 2020/0201526 | A1 | 6/2020 | Kuchibhotla |
| 2020/0210378 | A1* | 7/2020 | Kuchibhotla ....... G06F 11/1471 |
| 2020/0250046 | A1 | 8/2020 | Wong |

OTHER PUBLICATIONS

Bose et al., "CloudSpider: Combining Replication with Scheduling for Optimizing Live Migration of Virtual Machines Across Wide Area Networks", May 2011, 11 pages.

Consolidating/Committing snapshots in VMware ESXI (1002310), Last Updated: Mar. 19, 2021, https://kb.vmware.com/s/article/1002310.

Creating scheduled snapshots for persistent disk, https://cloud.google.com/compute/docs/disks/scheduled-snapshots.

International Search Report and Written Option of the International Searching Authority from PCT Application No. PCT/EP2022/053472 dated May 11, 2022, 10 pages.

Mark Minasi, Diskpart Takes Snapshots of Physical and Virtual Systems—Windows Server 2008 R2 and Windows 7 support VHD rollbacks, Jun. 24, 2010, https://www.itprotoday.com/server-virtualization/diskpart-takes-snapshots-physical-and-virtual-systems.

Overview of virtual machine snapshots in vSphere (1015180), Last Updated: Feb. 9, 2021, https://kb.vmware.com/s/article/1015180.

P. Chuang and W. Wong, "Generating Snapshot Backups in Cloud Virtual Disks," 2014 IEEE 17th International Conference on Computational Science and Engineering, Chengdu, China, 2014, pp. 1860-1863, doi: 10.1109/CSE.2014.341.

Puneet Agarwal and Lalit Grover, EBS Snapshot Scheduler—AWS Implementation Guide, Oct. 2016, 14 pgs, https://s3.amazonaws.com/solutions-reference/ebs-snapshot-scheduler/latest/ebs-snapshot-scheduler.pdf.

Zerto: Release Notes for Zerto 8.5 U2, REV01, Feb. 2021, ZVR-RN-8.5 U2, http://s3.amazonaws.com/zertodownload_docs/Latest/Zerto%20Virtual%20Replication%20Release%20Notes.pdf?cb=1616421915.

Appendix P, "List of Kyndryl Patents or Patent Applications Treated as Related" , Jul. 10, 2023, 2 pages.

* cited by examiner

ADAPTIVE SNAPSHOT CONTROLLER

BACKGROUND

The present disclosure relates to a scheduler for a cloud environment, and more specifically, to an adaptive snapshot scheduler for a multi-tenant public cloud.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

The job of any computing system is to store and manage information. Modern computing systems may store information on a number of different storage devices, which may be organized (e.g., combined together and/or divided) into logical groups, also known as volumes. A snapshot is a logical volume reflecting the contents of a given source volume at a specific point-in-time.

It is desirable to create snapshots when the system is not modifying data and/or communicating with other systems. Pausing the system for a significant period of time, however, may not always be possible. Accordingly, some snapshot schedulers may use a copy-on-write (COW) protocol. In COW schedulers, when a process tries to modify information, the system will first create a copy of that information, and the modifications will only be done on the copy. Other snapshot schedulers may be based on a mechanism of internal pointers to information that allow the source volume and its snapshot(s) to use a single copy of data for all portions that have not been modified. This approach is known as Redirect-on-Write (ROW).

While these techniques may reduce the impact of taking the snapshot, a momentary quiescing may sometimes be necessary at the time of the final completion of the snapshot to ensure consistency.

SUMMARY

According to embodiments of the present disclosure, a method is provided for adaptively controlling snapshot replication of a plurality of server snapshots in a multi-tenant public cloud using snapshot service. The method comprises receiving a plurality of snapshot requests from a plurality of clients in the multi-tenant public cloud and associating each of the plurality of snapshot requests with a service level agreement (SLA). The SLA includes a corresponding completion deadline and a slippage penalty. The method further comprises calculating, by a probabilistic model of active snapshot flows of a snapshot controller component, a predicted completion time for each of the plurality of snapshot requests. The method further comprises periodically determining, by the snapshot controller component, if any of the predicted completion times exceed their corresponding completion deadlines. In response, the method produces a possible MISS event for an associated first snapshot. The snapshot controller component, in response to producing the possible MISS event, minimizes a probability of breaching fulfilment times for the multi-tenant cloud. The method further comprises calculating the slippage penalty for each of the plurality of snapshot requests, and automatically identifying a second snapshot from among the plurality of snapshot requests. The slippage penalty for the second snapshot is less than the slippage penalty for the first snapshot. The method further comprises automatically throttling data transfer for the second snapshot.

According to embodiments of the present disclosure, an adaptive snapshot scheduler apparatus comprises a memory and a processor. The processor that is configured to receive a plurality of snapshot requests from a plurality of clients in the multi-tenant public cloud and associate each of the plurality of snapshot requests with a service level agreement (SLA). The SLA includes a corresponding completion deadline and a slippage penalty. The processor is further configured to calculate, by a probabilistic model of active snapshot flows of a snapshot controller component, a predicted completion time for each of the plurality of snapshot requests. The processor is further configured to periodically determine, by the snapshot controller component, if any of the predicted completion times exceed their corresponding completion deadlines, and, in response, produce a possible MISS event for an associated first snapshot. The snapshot controller component, in response to producing the possible MISS event, minimizes a probability of breaching fulfilment times for the multi-tenant cloud calculates the slippage penalty for each of the plurality of snapshot requests. This component automatically identifies a second snapshot from among the plurality of snapshot requests, wherein the slippage penalty for the second snapshot is less than the slippage penalty for the first snapshot, and automatically throttles a data transfer for the second snapshot.

A computer program product is also provided comprising instructions that, when run on a processor, are configured to execute the above-identified operations.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
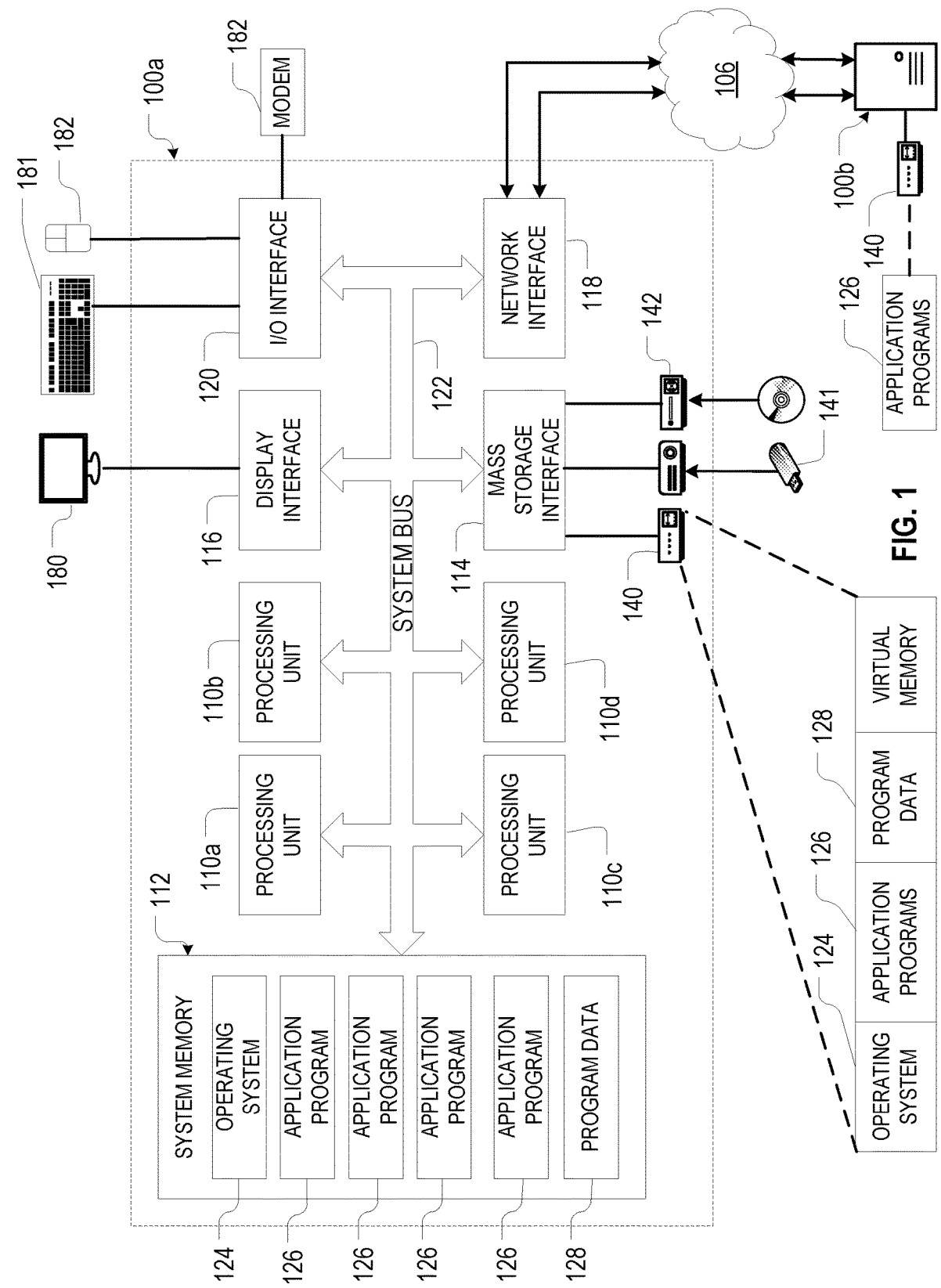
FIG. 1 illustrates an embodiment of a data processing system (DPS), consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to a scheduler for a cloud environment, more particular aspects relate to an adaptive snapshot scheduler for a multi-tenant public cloud. While the present disclosure is not necessarily limited to such applications, various aspects of the disclosure may be appreciated through a discussion of various examples using this context.

Data Processing System

FIG. 1 illustrates one embodiment of a data processing system (DPS) 100a, 100b (herein generically referred to as a DPS 100), consistent with some embodiments. FIG. 1 only depicts the representative major components of the DPS 100, and those individual components may have greater complexity than represented in FIG. 1. In some embodiments, the DPS 100 may be implemented as a personal computer; server computer; portable computer, such as a laptop or notebook computer, PDA (Personal Digital Assistant), tablet computer, or smartphone; processors embedded into larger devices, such as an automobile, airplane, teleconferencing system, appliance; smart devices; or any other appropriate type of electronic device. Moreover, components other than or in addition to those shown in FIG. 1 may be present, and that the number, type, and configuration of such components may vary.

The data processing system 100 in FIG. 1 may comprise a plurality of processing units 110a-110d (generically, processor 110 or CPU 110) that may be connected to a main memory 112, a mass storage interface 114, a terminal/display interface 116, a network interface 118, and an input/output ("I/O") interface 120 by a system bus 122. The mass storage interfaces 114 in this embodiment may connect the system bus 122 to one or more mass storage devices, such as a direct access storage device 140, a USB drive 141, and/or a readable/writable optical disk drive 142. The network interfaces 118 may allow the DPS 100a to communicate with other DPS 100b over a network 106. The main memory 112 may contain an operating system 124, a plurality of application programs 126, and program data 128.

The DPS 100 embodiment in FIG. 1 may be a general-purpose computing device. In these embodiments, the processors 110 may be any device capable of executing program instructions stored in the main memory 112, and may themselves be constructed from one or more microprocessors and/or integrated circuits. In some embodiments, the DPS 100 may contain multiple processors and/or processing cores, as is typical of larger, more capable computer systems; however, in other embodiments, the computing systems 100 may only comprise a single processor system and/or a single processor designed to emulate a multiprocessor system. Further, the processor(s) 110 may be implemented using a number of heterogeneous data processing systems 100 in which a main processor 110 is present with secondary processors on a single chip. As another illustrative example, the processor(s) 110 may be a symmetric multiprocessor system containing multiple processors 110 of the same type.

When the DPS 100 starts up, the associated processor(s) 110 may initially execute program instructions that make up the operating system 124. The operating system 124, in turn, may manage the physical and logical resources of the DPS 100. These resources may include the main memory 112, the mass storage interface 114, the terminal/display interface 116, the network interface 118, and the system bus 122. As with the processor(s) 110, some DPS 100 embodiments may utilize multiple system interfaces 114, 116, 118, 120, and buses 122, which in turn, may each include their own separate, fully programmed microprocessors.

Instructions for the operating system 124 and/or application programs 126 (generically, "program code," "computer usable program code," or "computer readable program code") may be initially located in the mass storage devices, which are in communication with the processor(s) 110 through the system bus 122. The program code in the different embodiments may be embodied on different physical or tangible computer-readable media, such as the memory 112 or the mass storage devices. In the illustrative example in FIG. 1, the instructions may be stored in a functional form of persistent storage on the direct access storage device 140. These instructions may then be loaded into the main memory 112 for execution by the processor(s) 110. However, the program code may also be located in a functional form on the computer-readable media, such as the direct access storage device 140 or the readable/writable optical disk drive 142, that is selectively removable in some embodiments. It may be loaded onto or transferred to the DPS 100 for execution by the processor(s) 110.

With continuing reference to FIG. 1, the system bus 122 may be any device that facilitates communication between and among the processor(s) 110; the main memory 112; and the interface(s) 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The main memory 112 and the mass storage device(s) 140 may work cooperatively to store the operating system 124, the application programs 126, and the program data 128. In some embodiments, the main memory 112 may be a random-access semiconductor memory device ("RAM") capable of storing data and program instructions. Although FIG. 1 conceptually depicts that the main memory 112 as a single monolithic entity, the main memory 112 in some embodiments may be a more complex arrangement, such as a hierarchy of caches and other memory devices. For example, the main memory 112 may exist in multiple levels of caches, and these caches may be further divided by function, such that one cache holds instructions while another cache holds non-instruction data that is used by the processor(s) 110. The main memory 112 may be further distributed and associated with a different processor(s) 110 or sets of the processor(s) 110, as is known in any of various so-called non-uniform memory access (NUMA) computer architectures. Moreover, some embodiments may utilize virtual addressing mechanisms that allow the DPS 100 to behave as if it has access to a large, single storage entity instead of access to multiple, smaller storage entities (such as the main memory 112 and the mass storage device 140).

Although the operating system 124, the application programs 126, and the program data 128 are illustrated in FIG. 1 as being contained within the main memory 112 of DPS 100a, some or all of them may be physically located on a different computer system (e.g., DPS 100b) and may be accessed remotely, e.g., via the network 106, in some embodiments. Moreover, the operating system 124, the application programs 126, and the program data 128 are not necessarily all completely contained in the same physical DPS 100a at the same time, and may even reside in the physical or virtual memory of other DPS 100b.

The system interfaces 114, 116, 118, 120 in some embodiments may support communication with a variety of storage and I/O devices. The mass storage interface 114 may support the attachment of one or more mass storage devices 140, which may include rotating magnetic disk drive storage devices, solid-state storage devices (SSD) that uses integrated circuit assemblies as memory to store data persistently, typically using flash memory or a combination of the two. Additionally, the mass storage devices 140 may also comprise other devices and assemblies, including arrays of disk drives configured to appear as a single large storage device to a host (commonly called RAID arrays) and/or archival storage media, such as hard disk drives, tape (e.g., mini-DV), writable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like. The I/O interface 120 may support attachment of one or more I/O devices, such as a keyboard 181, mouse 182, modem 183, or printer (not shown)

The terminal/display interface 116 may be used to directly connect one or more displays 180 to the data processing system 100. These displays 180 may be non-intelligent (i.e., dumb) terminals, such as an LED monitor, or may themselves be fully programmable workstations that allow IT administrators and users to communicate with the DPS 100. Note, however, that while the display interface 116 may be provided to support communication with one or more displays 180, the computer systems 100 does not necessarily require a display 180 because all needed interaction with users and other processes may occur via the network 106.

The network 106 may be any suitable network or combination of networks and may support any appropriate protocol suitable for communication of data and/or code to/from multiple DPS 100. Accordingly, the network interfaces 118 may be any device that facilitates such communication, regardless of whether the network connection is made using present-day analog and/or digital techniques or via some networking mechanism of the future. Suitable networks 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols may be used to implement the network 106. The Transmission Control Protocol/Internet Protocol ("TCP/IP") suite contains a suitable network and transport protocols.

Cloud Computing

Figure 2:
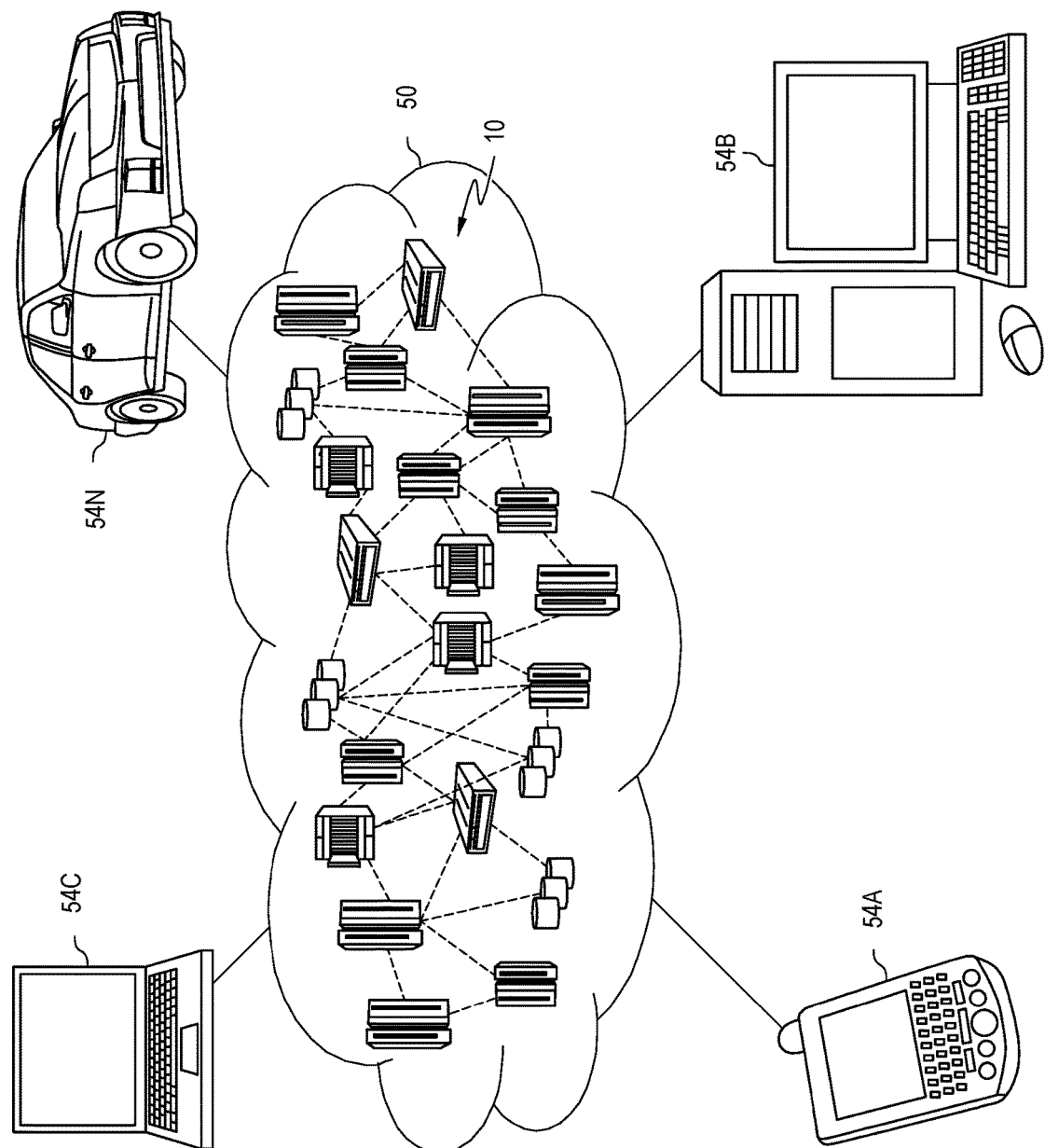
FIG. 2 depicts a cloud computing environment, consistent with some embodiments.

FIG. 2 illustrates one embodiment of a cloud environment suitable for an edge enabled scalable and dynamic transfer learning mechanism. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher-level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
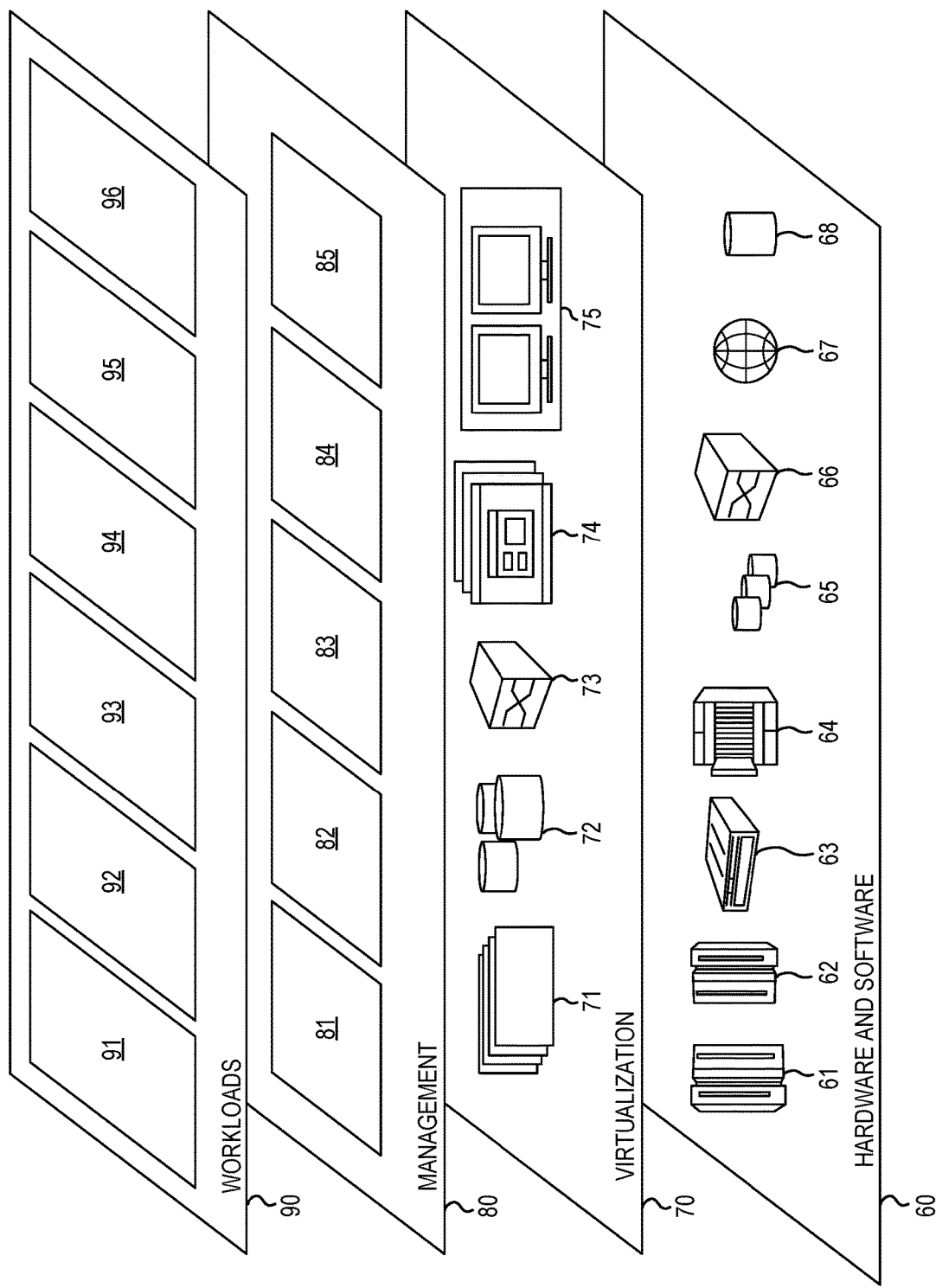
FIG. 3 depicts abstraction model layers, consistent with some embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an application module 96. Snapshot Scheduler Each DPS 100 in the cloud computing environment 50 may support multiple virtual machines (VMs), particularly if the cloud computing environment 50 is configured as a multi-tenant public cloud 50' (see FIG. 5). Snapshots of these VMs may be created to achieve various data protection goals, including: (i) data recovery to a previous snapshot; (ii) disaster recovery (DR) purposes as seeds; and (iii) migration to another cloud in a rapid manner.

A customer/client ("clients") in the multi-tenant public cloud 50' may want their snapshot(s) captured securely and stored quickly so that they can provide protection from failures. Multi-tenant public clouds 50', however, may experience bottlenecks and other forms of unexpected congestion, as each clients' workload ebbs and flows. As these delays are unbounded, they represent a potential risk to the clients' backup (e.g., snapshot) strategies.

Each client's tolerance for this risk differs, however. Some clients, based on their particular VM workloads and regulatory environment, may be highly intolerant of delays, while other clients may be more price sensitive. To support these different types of clients, a cloud provider may offer different service levels associated with the time to complete the snapshot. These service levels may be specified in service level agreements (SLAs) associated with each client.

The SLAs may each define a deadline for completing the snapshot and a slippage penalty for missing that deadline.

One complicating factor is that the size of a snapshot is not static. For example, because there may be a variable, bounded outbound data exchange rate from a hypervisor on a DPS 100 and a variable, bounded inbound throughput to the storage volume in which the snapshot will be stored, as the number of requests rise, the size of the snapshot and the amount of time necessary to transfer that amount of information can both change moment to moment. Accordingly, one feature and advantage of some embodiments of this disclosure is a service can manage snapshot requests to ensure that the requests are completed within their specified limits in the relevant SLAs (time to snapshot). As a result, some embodiments may enable satisfaction clients' desires for an upper bound on the time it takes to create a snapshot and save it in a secure storage, without unnecessarily increasing the amount of infrastructure in the cloud environment used to satisfy those desires.

Another aspect of some embodiments is snapshot-as-a-service that can manage snapshots' time-to-complete to a plurality of different service levels. Each service level, in turn, may be specified in the associated client SLAs, which may include penalties for missed deadlines ("slippage penalty"). Accordingly, some embodiments may adaptively schedule snapshots to minimize slippage penalties in a multi-tenant public clouds when the intervening network infrastructure has temporary bottlenecks and other bandwidth issues.

Figure 4:
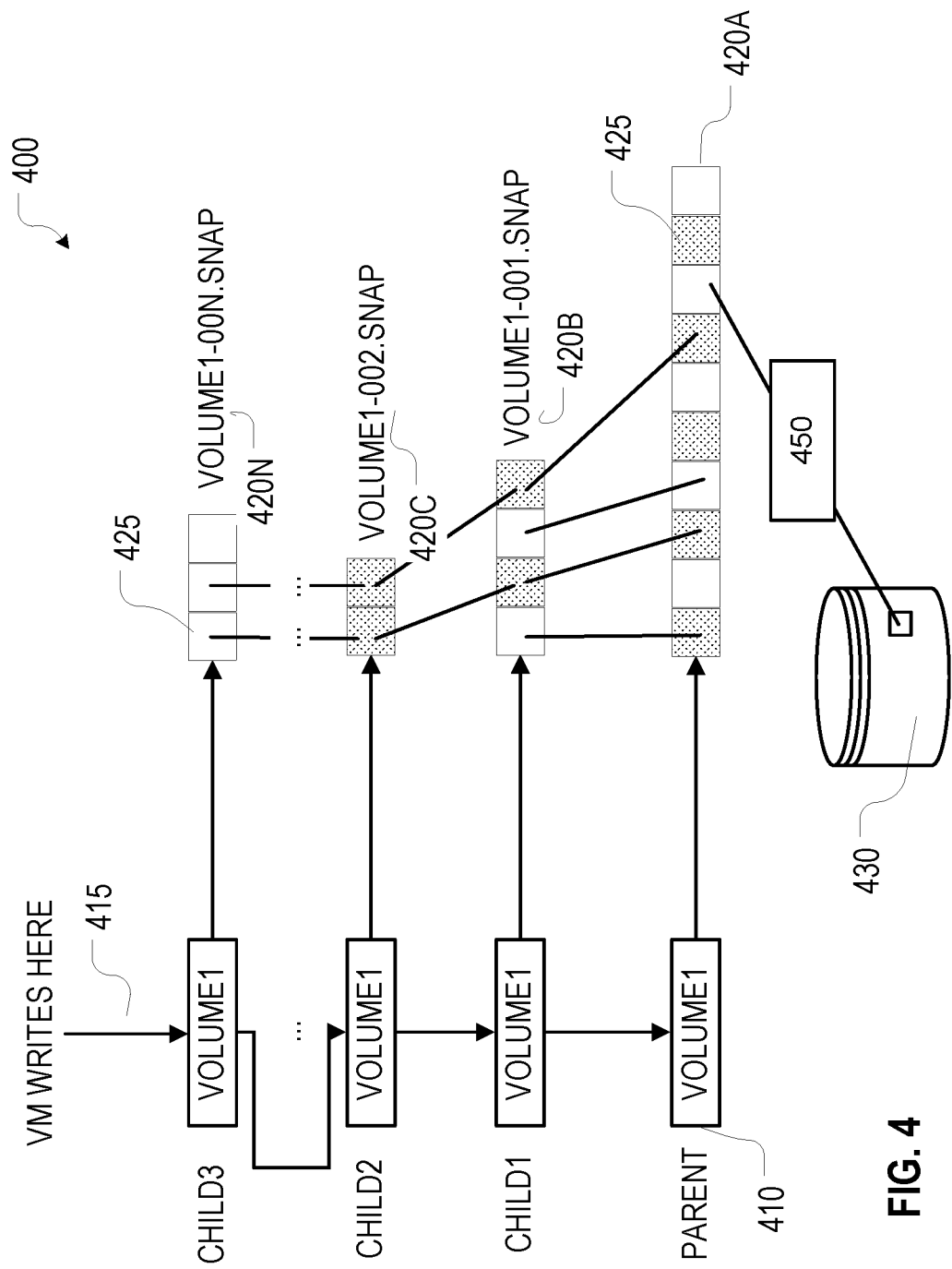
FIG. 4 is a diagram of an adaptive scheduler for implementing an example snapshot plan of a parent volume, consistent with some embodiments.

FIG. 4 is a diagram of an adaptive scheduler 400 for implementing an example snapshot plan of a parent volume 410, consistent with some embodiments. Any, some, or all of the parent volume 410 and other volumes may be implemented as, e.g., a virtual disk (VD). The snapshot plan in this example specifies that a chain 415 of incremental snapshots 420A-420N (generically, snapshots 420) should be created and that each incremental snapshot 420N in the chain 415 should be completed within a predetermined amount of time from the previous incremental snapshot 420n-1. Each of the incremental snapshots 420, in turn, may comprise one or more blocks of data (or grains) 425 (only some labeled for clarity). The adaptive scheduler 400 may be implemented as a part of the application module 96.

As shown in FIG. 4, a lines illustrate associations between child blocks, where two vertices corresponding to each line stand for the same virtual disk block that are part of different child spawns. A higher-level child disk might refer to any of the lower level disks through an illustrated line that logically depicts the fact that the block on which the application wrote is copied over to the higher-level disk. When this occurs, any future read/write will occur from the higher-level disk only for that block. Any lower-level disk is read-only and is used for a read whenever a datum is read whose block is not available in the higher-level disk.

In operation, when a client first initiates the snapshot plan, a first parent snapshot 420A may be created from the parent volume 410. In the example embodiment in FIG. 4, successive snapshots requests may generate new child snapshots 420B-420N, each representing changed information since the previous child snapshot in the chain 415. These child snapshots 420A-420N are commonly smaller in size than the first snapshot 420A, but may be similar or even larger in some applications under some circumstances. This example plan is simplified for purposes of explanation, however, and more complex plans are consistent with this disclosure and the relationships described herein may change if there are multiple branches in the snapshot chain 415. Additionally, while this example plan is described with reference to virtual hard drive (VHD) based snapshots, some embodiments may also be used to create snapshots of physical mass storage devices.

Once a client issues a request for the next snapshot 420N+1 in the chain 415, then some embodiments may first identify the associated child snapshot 420N and send it to a designated data store 430 for safekeeping. Identifying the child may be done on the source (at the hypervisor hosting the VMs). The identified snapshot is sent to the target (the data store 430).

Next, in response to receiving the snapshot request, some embodiments may calculate the size of the data to be transferred from the size of the snapshot corresponding to the new child snapshot 420N+1. A snapshot service 450 may then manage the transfer of the new child snapshot 420N+1 to the data store 430 such that it, and other clients' requests, all complete before their respective SLA deadlines. In some embodiments, size is not a function of the time. When a snapshot request is made, the current child may be made read-only and a new child disk is created. Here, the snapshot comprises the data in the older disk. As a consequence, the size is fixed and not changing. For example, if Child 2 is the current disk where all writes go, and a new snapshot is to be taken, then Child 2 disk is made read-only and a new Child 3 disk is created. Here, the size of Child 2 is not fixed—this Child 2 disk has to be transferred to the snapshot storage location in time.

Figure 5:
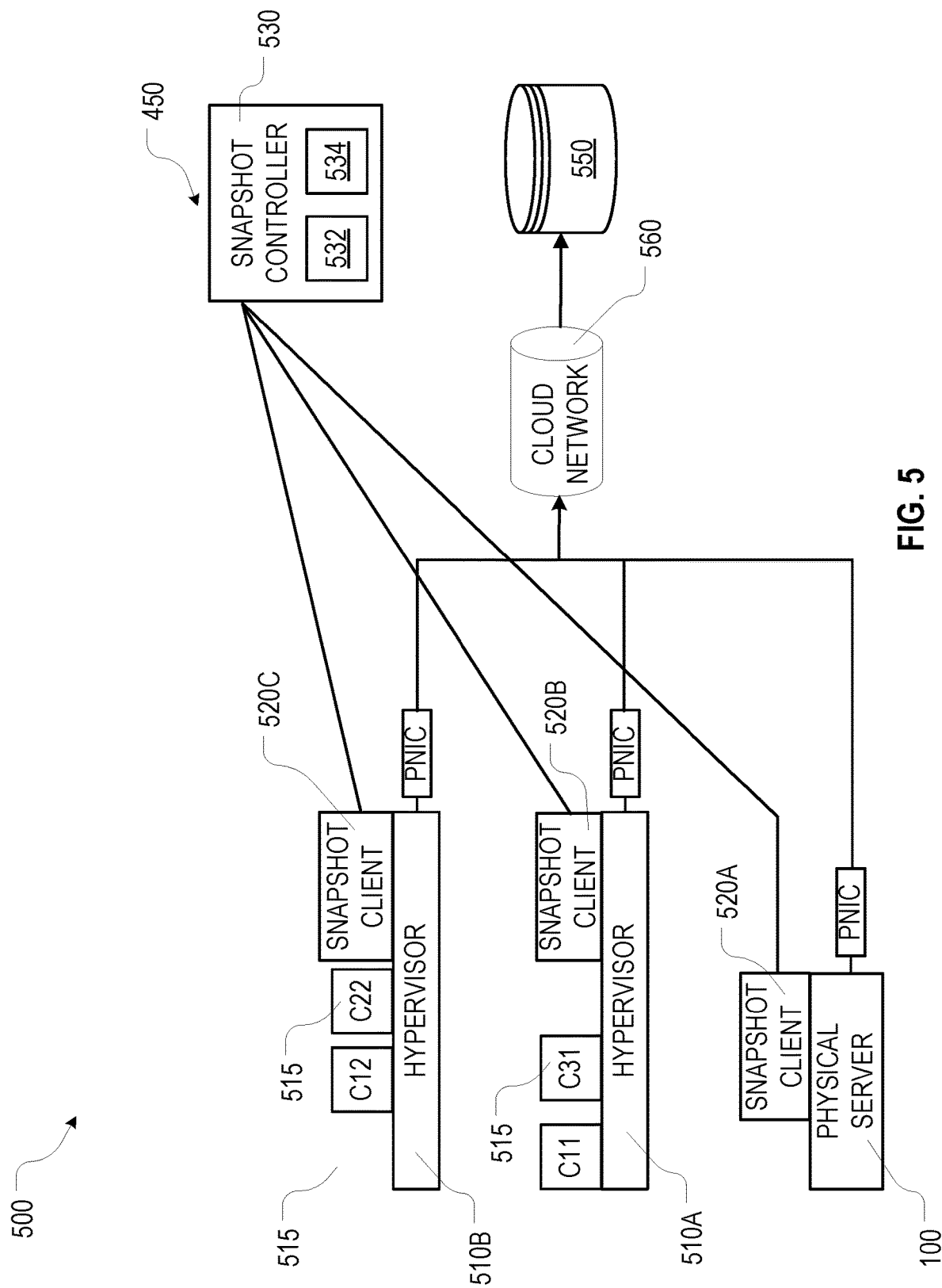
FIG. 5 is a system diagram of the snapshot service in operation, consistent with some embodiments.

FIG. 5 is a system diagram of the snapshot service 450 in operation, consistent with some embodiments. The snapshot service 450 embodiment in FIG. 5 may comprise a physical DPS 100, a snapshot controller 530, a remote object store 550, and a cloud network 560, all physically connected and logically organized into a multi-tenant public cloud 500, which may be structured according to the cloud computing environment 50. In some embodiments, this may be an internal network, but may include paths that pass through other networks, such as the public Internet. For example, generally in public clouds, if the target service (the data store in this case) is in the same "availability zone" as the source, the network path is internal, but if it is in a different "region", it may be external.

The physical DPS 100 in this embodiment may support two hypervisors 510A, 510б that may each abstract a plurality of client (e.g., C11-CN) VMs 515 from the hardware of the DPS 100, and a snapshot client 520A, 520B (generically snapshot client 520). Each physical DPS 100 may include one or more physical network interface controllers (pNIC) that may transfer data from the client VMS 515 to the remote object store 550 over the network 560. The snapshot clients 520A, 520B, in turn, may coordinate those transfers with the snapshot controller 530. The snapshot controller 530 may include a replication stopper component 532 and a replication starter component 534 in some embodiments.

In operation, the snapshot controller 530 may receive a client request at time ("R"). In response, the snapshot controller 530 may initially set a remaining amount of data to be transferred ("D") equal to the size of the next snapshot from the associated snapshot client 520. Next, the snap shot controller 530 may calculate a target time ("R+S") by which the snapshot replication should be complete (e.g., successfully transferred to the remote object store 550), where "S" may be an amount of time specified in a service level agreement (SLA) with that particular client for that particular workload on that particular VM 515. The snapshot controller 530 may also calculate an amount of data remaining to be transferred ("D(R+t)") at a point of time in interest ("t"). The required rate of transfer rate to meet SLA at time R+t may then be calculated as: D(R+t)/(S−t).

As will be discussed in more detail below, snapshot controller 530 may calculate a delta ("δ") at time "t" for each pending snapshot based on a comparison between the required rate of transfer and a predicted rate of transfer (discussed in more detail below). These deltas δ may be positive or negative (i.e., may be projected to finish before the deadline or after the deadline). A cost function ("P") may be calculated from these deltas δ and their associated SLAs. This cost function may be linear to delta δ or may be non-linear to δ e.g., exponential or quadratic. Additionally, the cost function P may be different for positive and negative deltas δ. For example P(δ) for one illustrative embodiment may be:

if δ>0 then $P1(δ)$ may be an exponential function of δ; and if δ<0, then $P2(δ)$ may be proportional to $-1/(D(R+t)/(|δ|*T(R+t)))$ In response to a MISS event (e.g., a positive delta δ), the replication stopper component 532 may stop replication of one or more other pending snapshots to improve the sum of all of the cost functions P for all of the pending snapshots in the multi-tenant public cloud 50'. More specifically, while there is an unprocessed MISS event, one embodiment of the replication stopper component 532 may try to identify another pending snapshot that can be stopped e.g., $P(δ)<=P_h(δ)$. This may include first analyzing the multi-tenant public cloud 50' to determine a likely cause of the miss event e.g., is there a bottleneck in the system, and if so, is that bottleneck local to the physical DPS 100 hosting the customer VM 515 or is it in the cloud network 560. If the bottleneck is local e.g., the pNIC on the host 100 is saturated, then the replication stopper component 532 may try to pause a snapshot with lowest P(δ) from the local host 100 (e.g., the snapshot with the most negative delta δ). If the bottleneck is in the network 560, then the replication stopper component 532 may look for the next snapshot underway with $P(δ)<=P_h(δ)$ from other hosts 100, and then may set a variable "OutsideNetwork=Choked." In either case, if stopping of replication of a snapshot does not actually decrease the P(δ), then the replication with the highest P(δ) on the corresponding host 100 may be started.

In this instance, the focus is on the multi-tenancy of interest at that point in time. If the bottleneck is at the host 100, the multi-tenancy of interest may be limited to the extent of snapshot requests originating from that particular host 100. But if the bottleneck is at the target storage, the multi-tenancy of interest may encompass all requests that are being fulfilled. If the bottleneck is on the intervening network, depending on the location of the bottleneck, the multi-tenancy of interest may encompass a subset of requests that flow through the location of the network bottleneck. The host where the workload is running may be single- or multi-tenant. In any case, the network between the host and the final storage destination may be shared across tenants. Throughput saturation can occur at the host or at some place in the intervening network.

In response to receiving a new replication request from one of the snapshot client 520, the replication starter component 534 may add it to a pending queue. The replication starter component 534 may then check whether the outside network 560 has available bandwidth e.g., "OutsideNetwork" is not "Choked." If the network 560 has bandwidth, then then replication starter component 534 may pick the snapshot with the highest P(δ) in the queue as the next snapshot to be transferred. If the host 100 associated with that snapshot is not choked, then the replication starter component 534 may start replication of the selected snapshot. However, if the host 100 of the selected snapshot is saturated, then the replication starter component 534 may replace the smallest running snapshot currently executing on that host 100 with the selected snapshot. In either case, upon completion of the replication, the replication starter component 534 may reset "OutsideNetwork" to be "NotChoked."

Snapshot Controller

Figure 6:
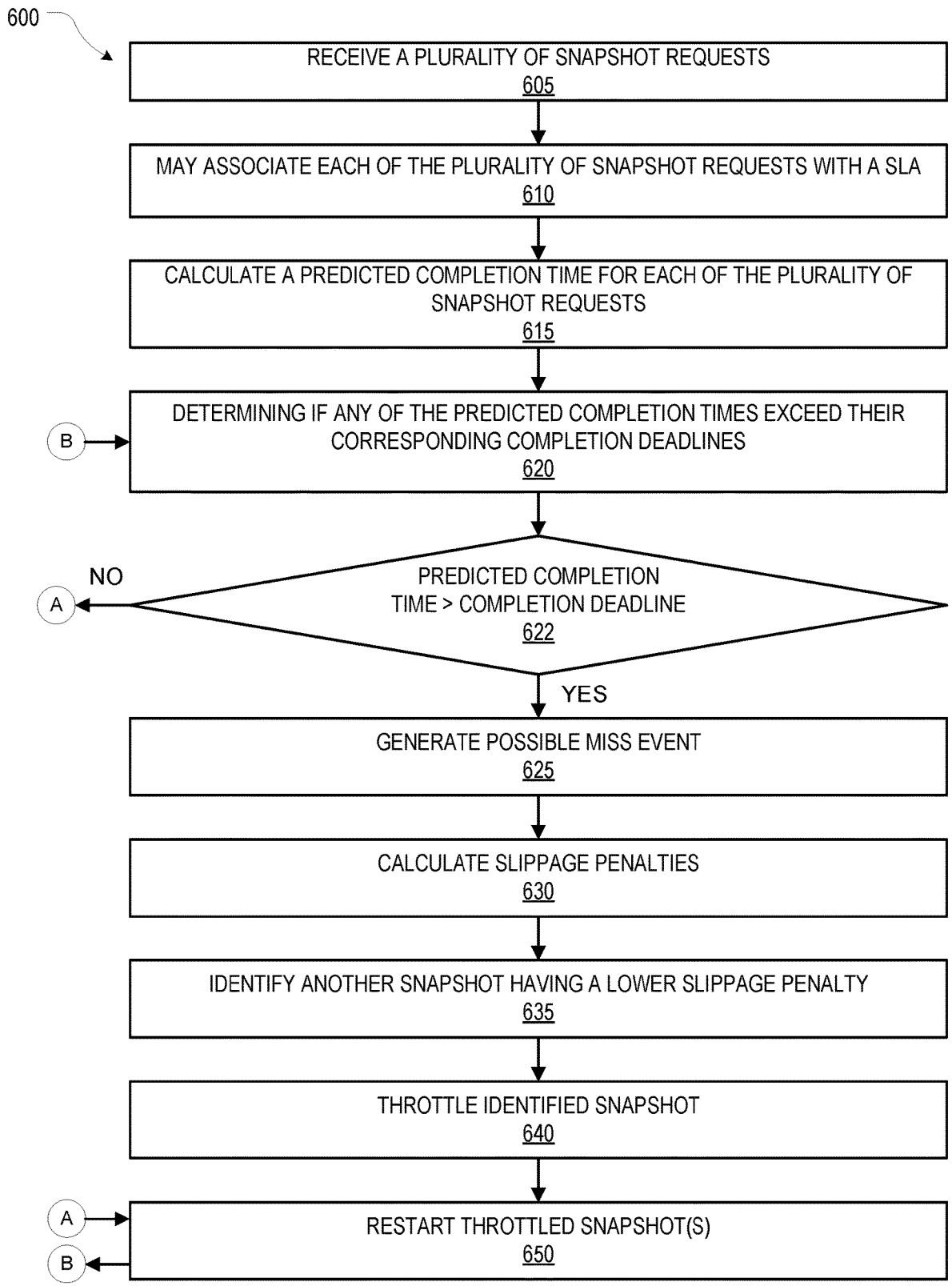
FIG. 6 is a flow chart illustrating one method for adaptively controlling snapshot replication of a plurality of server snapshots in a multi-tenant public cloud using snapshot service, consistent with some embodiments.

FIG. 6 is a flow chart illustrating one method 600 for adaptively controlling snapshot replication of a plurality of server snapshots in a multi-tenant public cloud 50' using snapshot service, consistent with some embodiments. At operation 605, the snapshot controller 530 may receive, via the snapshot clients 520, a plurality of snapshot requests from a plurality of clients in the multi-tenant public cloud. At operation 610, the snapshot controller 530 may associate each of the plurality of snapshot requests with one or more SLAs. The one or more SLAs may each include a corresponding completion deadline and a slippage penalty for the requested snapshot. In some embodiments, the set of SLA options (e.g., completion deadline and slippage penalty) that can be offered for a particular VM image may be based on a size of a disk associated with the VM disk and the probabilistic model of active snapshot flows.

At operation 615, the snapshot controller 530 may calculate a predicted completion time for each of the plurality of snapshot requests. As will be discussed in more detail below, this calculation may utilize a probabilistic model of the active snapshot flows that receives a current data exchange rate and a current snapshot size as inputs. The active snapshot flows may include all of the active snapshots and pending snapshots in the multi-tenant public cloud 50'.

The snapshot controller 530 may then periodically determining if any of the predicted completion times exceed their corresponding completion deadlines at operation 620. In response to a predicted completion time exceeding the corresponding completion deadline, the snapshot controller 530 may produce a possible MISS event for an associated first snapshot at operations 622-625.

In response to producing the possible MISS event, the snapshot controller 530 may attempt to minimize a probability of breaching fulfillment times for the multi-tenant cloud and/or minimize the penalties from those breaches. In some embodiments, this may comprise calculating the slippage penalty for each of the plurality of current and pending snapshot requests at operation 630. Next, the snapshot controller 530 may automatically identify a second snapshot from among the plurality of snapshot requests having a slippage penalty that is less than the slippage penalty for the first snapshot at operation 635. This may include identifying where any bottlenecks are occurring e.g., on the local DPS 100 containing the first VM, upstream in the cloud network 560, etc., and then selecting an appropriate second snapshots based at least in part on that determination. The snapshot may then automatically throttle, or even stop, data transfer for the second snapshot at operation 640.

If no snapshots produce MISS events e.g., all are HIT events, then the snapshot controller 530 may automatically increase data transfer and/or restart data transfer for any throttled/stopped snapshots at operation 650.

Replication Stopper Component

Figure 7:
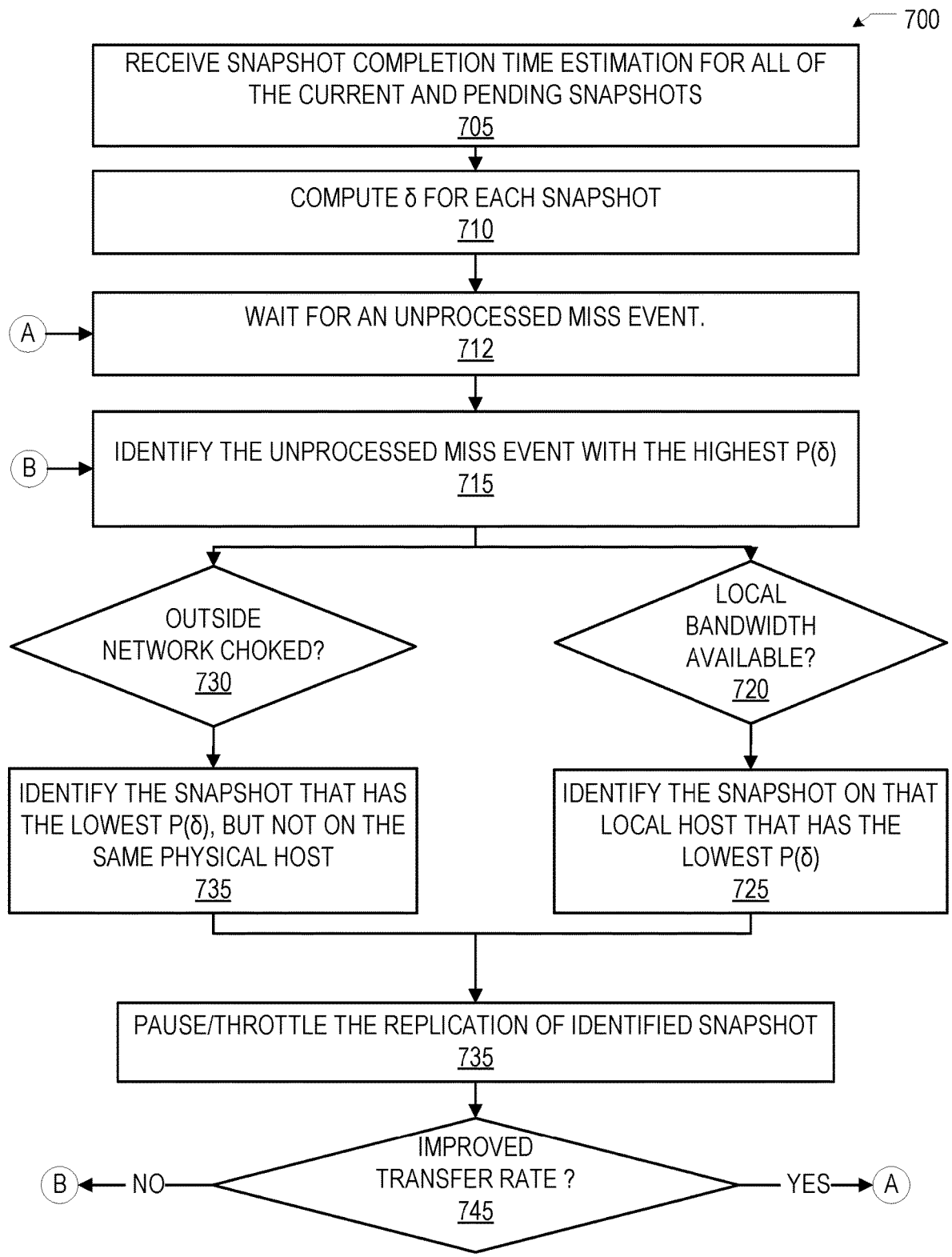
FIG. 7 is a flow chart of the replication stopper component of the snapshot controller in more detail, consistent with some embodiments.

FIG. 7 is a flow chart of the replication stopper component 532 of the snapshot controller 530 in more detail, consistent with some embodiments. At operation 705, the replication stopper component 532 may receive a snapshot completion time estimation for all of the current and pending snapshots managed by the snapshot controller 530. The replication stopper component 532 may then use those estimates to compute delta δ for each snapshot at operation 710.

At operation 712, the replication stopper component 532 may wait for an unprocessed MISS event. While there are another unprocessed MISS events, the replication stopper component 532 may first identify the unprocessed MISS event with the highest P(δ) ("E") at operation 715.

The replication stopper component 532 may then proceed to operations 720-725 or operation 730-735. The replication stopper component 532 may determine whether or not the pNIC on the local host 100 associated with snapshot E is fully utilized (i.e., E.snapshot.host.pNIC.bandwidth.available==0) at operation 720. If sufficient local bandwidth is not available, then replication stopper component 532 may identify, at operation 725, the snapshot on that local host 100 ('host') that is: (i) being replicated; and (ii) has the lowest P(δ) (i.e., S_min=arg(min$_i$(P(δ$_{i,host}$)))). Note, P(δ) may be zero for certain snapshots in some embodiments. Additionally, if S_min equals E.snapshot, then no replications may be stopped (i.e., S_min=NULL) in some embodiments and flow may proceed to operation picking the next highest (in terms of P(δ)) MISS event in the queue.

Alternatively, the replication stopper component 532 may determine whether or not the outside network 560 is choked at operation 730. If so, then the replication stopper component 532 may identify the snapshot that is being replicated and has the lowest P(δ), but not on the same physical host 100 (i.e., S_min=arg(min$_i$(P(δ$_{i,-host}$)) at operation 735.

If a snapshot was identified at either operation 725 or 735 (i.e., S_min<>NULL), then the replication stopper component 532 may pause/throttle the replication of S_min at operation 740. If the replication stopper component 532 determines (at operation 745) that previous pausing/throttling of the snapshot did not lead to improvement of the transfer rate (i.e., $T_a \leq T_b$, where $T_a$ equals the transfer rate T(t) of S_min after replication is paused/throttled; and $T_b$ equals current transfer before pausing or stopping of S_min), then flow may proceed back to operation 720, otherwise flow proceeds to operation 712.

Transfer Rate Calculation

Figure 8:
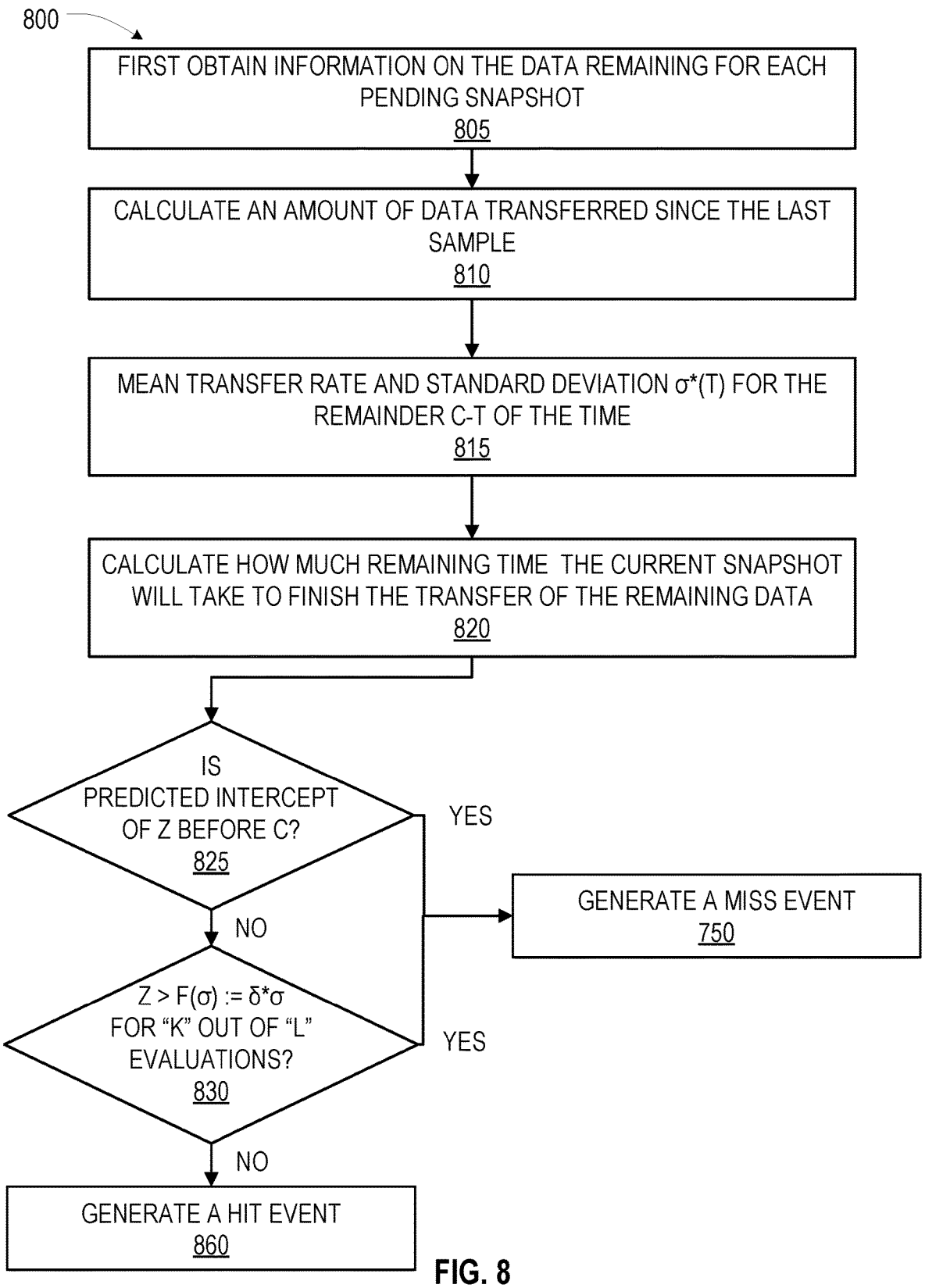
FIG. 8 is a flow chart illustrating one method of predicting at a point of interest whether or not a snapshot replication will finish by a cutover time, consistent with some embodiments.

FIG. 8 is a flow chart illustrating one method 800 of predicting at a point of interest in time ("t") whether or not a snapshot replication will finish by a cutover time ("C," equal to R+S), consistent with some embodiments. The snapshot controller 530 may first obtain information on the data remaining ("D(t)") for each pending snapshot from the snapshot client(s) 520 at operation 805. The snapshot controller 530 may use this information at operation 810 to calculate an amount of data transferred since the last sample ("B") (e.g., 20 GB of 100 GB moved). More specifically, some embodiments may receive measurements S at different points in time (t) of the size of the remaining data in the snapshot to be transferred e.g., $S_R$ and $S_{R+t}$, taken at the receipt of request at time "R", and "t" seconds after receiving that request. A current transfer rate as seen by the pNIC at DPS 100 at time R+t for a sample may then be calculated as $(S_R - S_{R+t})/t$. In some embodiments, the value of S at time zero (i.e., S(0)) may be the total bytes to be transferred for the snapshot.

At operation 815, a mean transfer rate (T*(t)) and standard deviation σ*(t) for the remainder C−t of the time (i.e., after time t) may be calculated. In some embodiments, the mean transfer rate may be estimated T*(t) by taking the average of the last "m" samples (e.g., at least m>30) taken up to time "t." For example, a sample value $T_y$ at time "y" may be calculated by first obtaining $B_y$ of S(0) at time y and leveraging $B_x$ of S(0) of the previous sample taken at time x, then calculating $T_y$ (as shown in FIG. 9). In some embodiments, the more recent samples may be weighted to in the calculation of T*(t). $B_x$ represents the data already transferred at time x. S(t) is the data that remains to be transferred at time t. So it is $B_y$ of S1(0) and $B_x$ of S2(0) where S1 and S2 are 2 different samples. $B_y$ of S(0), where S(0) is (by definition) the total data to be transferred for a snapshot at time 0, and $B_y$ is the data transferred by time y. So $B_x$ of S(0) is the data transferred by time x.

At operation 820, the snapshot controller 530 may calculate how much remaining time ("Z") the current snapshot will take to finish the transfer of the remaining data e.g., Z(t):=S(t)/(C−t)— T*(t). As long as Z(t) remains negative in [0, C], that snapshot's replication should complete before C. If, however when Z(t) becomes positive before C and stays like that for a predetermined interval, then it is unlikely that the snapshot will complete replication by C unless the snapshot controller 530 preforms the prioritization discussed with reference to FIG. 7.

Accordingly, some embodiments may define two alert conditions. At operation 825, if the predicted intercept of the Z at time t intercepts the x-axis before C, and this situation exists for "K" out of "L" successive predictions (i.e., time t is the Lth situation), then the snapshot controller 530 will generate a MISS event alarm at operation 850. At operation 830, if Z>f(σ):=δ*σ (where δ may be a small positive number representing the distance between the completion time [C] and the intercept of Z on the time axis) and this situation persists in "K" out of "L" (i.e., time t is the Lth situation) successive evaluations, then the snapshot controller 530 will raise a MISS event alarm at operation 850. If neither Alert Condition 1 nor Alert Condition 2 is true, then the snapshot controller 530 may raise a Hit Event at operation 860.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Therefore, it is desired that the embodiments described herein be considered in all respects as illustrative, not restrictive, and that reference be made to the appended claims for determining the scope of the invention.

What is claimed is:

1. A method, comprising:
receiving a plurality of snapshot requests from a plurality of clients in a multi-tenant public cloud;
calculating, by a probabilistic model of active snapshot flows of a snapshot controller component, a predicted completion time for each of the plurality of snapshot requests;
producing a possible MISS event for a first snapshot of the plurality of snapshot requests based on the predicted completion time of the first snapshot and a completion deadline of the first snapshot; and
in response to producing the possible MISS event: automatically identifying a second snapshot from among the plurality of snapshot requests, wherein a slippage penalty for the second snapshot is less than a slippage penalty for the first snapshot; and automatically throttling data transfer for the second snapshot.

2. The method of claim 1, wherein the probabilistic model of active snapshot flows receives inputs comprising a current data exchange rate and a current snapshot size.

3. The method of claim 1, further comprising automatically stopping the data transfer for the second snapshot.

4. The method of claim 1, wherein the plurality of snapshot requests are each associated with a virtual machine (VM), and the method further comprising:
   determining a set of snapshot service level agreement options that can be offered for an image of the virtual machine based on a size of a storage volume associated with the virtual machine and the model of active snapshot flows.

5. The method of claim 1, wherein the active snapshot flows comprise a plurality of active snapshots and a plurality of pending snapshots.

6. The method of claim 1, wherein the automatically identifying the second snapshot comprises identifying a bottleneck and determining whether the bottleneck is local to a data processing system or is a cloud network bottleneck.

7. The method of claim 6, wherein, in response to determining the bottleneck is local to the data processing system, the second snapshot is a local snapshot having a lowest slippage penalty.

8. The method of claim 6, wherein, in response to determining the bottleneck is in a cloud network, the second snapshot is a snapshot having a lowest slippage penalty in the multi-tenant public cloud.

9. An adaptive snapshot scheduler apparatus, comprising:
   a memory; and
   a processor that is configured to:
      receive a plurality of snapshot requests from a plurality of clients in a multi-tenant public cloud;
      calculate, by a probabilistic model of active snapshot flows of a snapshot controller component, a predicted completion time for each of the plurality of snapshot requests;
      produce a possible MISS event for a first snapshot of the plurality of snapshot requests based on the predicted completion time of the first snapshot and a completion deadline of the first snapshot; and
      in response to producing the possible MISS event: automatically identify a second snapshot from among the plurality of snapshot requests, wherein a slippage penalty for the second snapshot is less than a slippage penalty for the first snapshot; and automatically throttle data transfer for the second snapshot.

10. The apparatus of claim 9, wherein the probabilistic model of active snapshot flows receives inputs comprising a current data exchange rate and a current snapshot size.

11. The apparatus of claim 9, wherein the processor is configured to automatically stop the data transfer for the second snapshot.

12. The apparatus of claim 9, wherein the plurality of snapshot requests are each associated with a virtual machine (VM), and the processor is configured to:
   determining a set of snapshot service level agreement options that can be offered for an image of the virtual machine based on a size of a storage volume associated with the virtual machine and the model of active snapshot flows.

13. The apparatus of claim 9, wherein the active snapshot flows comprise a plurality of active snapshots and a plurality of pending snapshots.

14. The apparatus of claim 9, wherein the automatically identifying the second snapshot comprises identifying a bottleneck.

15. A computer program product for an adaptive snapshot scheduler apparatus, the computer program product comprising:
   one or more computer readable storage media, and program instructions collectively stored on the one or more computer readable storage media, the program instructions comprising program instructions to:
      receive a plurality of snapshot requests from a plurality of clients in a multi-tenant public cloud;
      calculate, by a probabilistic model of active snapshot flows of a snapshot controller component, a predicted completion time for each of the plurality of snapshot requests;
      produce a possible MISS event for a first snapshot of the plurality of snapshot requests based on the predicted completion time of the first snapshot and a completion deadline of the first snapshot; and
      in response to producing the possible MISS event: automatically identify a second snapshot from among the plurality of snapshot requests, wherein a slippage penalty for the second snapshot is less than a slippage penalty for the first snapshot; and automatically throttle data transfer for the second snapshot.

16. The computer program product of claim 15, wherein the probabilistic model of active snapshot flows receives inputs comprising a current data exchange rate and a current snapshot size.

17. The computer program product of claim 15, wherein the program instructions are configured to automatically stop the data transfer for the second snapshot.

18. The computer program product of claim 15, wherein the plurality of snapshot requests are each associated with a virtual machine (VM), and the program instructions are configured to:
   determining a set of snapshot service level agreement options that can be offered for an image of the virtual machine based on a size of a storage volume associated with the virtual machine and the model of active snapshot flows.

19. The computer program product of claim 15, wherein the active snapshot flows comprise a plurality of active snapshots and a plurality of pending snapshots.

20. The computer program product of claim 15, wherein the automatically identifying the second snapshot comprises identifying a bottleneck.

* * * * *